United States Patent [19]
Walters et al.

[11] Patent Number: 5,390,634
[45] Date of Patent: Feb. 21, 1995

[54] INTERNAL COMBUSTION ENGINE HAVING HIGH PERFORMANCE COMBUSTION CHAMBER

[75] Inventors: Craig E. Walters, Richland Center; Tim Tiller, Blue River; Dan Kinsey, LaFarge; George B. Smith, Richland Center, all of Wis.

[73] Assignee: S & S Cycle, Inc., Viola, Wis.

[21] Appl. No.: 110,406

[22] Filed: Aug. 20, 1993

[51] Int. Cl.[6] .............................................. F02B 23/08
[52] U.S. Cl. ................................. 123/193.5; 123/671
[58] Field of Search ............ 123/661, 666, 671, 193.5, 123/193.6

[56] References Cited

U.S. PATENT DOCUMENTS

| | | | |
|---|---|---|---|
| 4,259,933 | 4/1981 | Nakanishi et al. | 123/661 |
| 4,296,720 | 10/1981 | Nakanishi et al. | 123/661 |
| 4,467,752 | 8/1984 | Yunick | 123/671 |
| 4,541,377 | 9/1985 | Amos | 123/661 |
| 4,763,622 | 8/1988 | Indra et al. | 123/671 |
| 4,838,222 | 6/1989 | Yanagisawa et al. | 123/263 |
| 4,844,040 | 7/1989 | Leighton et al. | 123/306 |
| 5,081,965 | 1/1992 | Walters et al. | 123/188 |
| 5,115,774 | 5/1992 | Nomura et al. | 123/276 |
| 5,115,776 | 5/1992 | Ohno et al. | 123/299 |

FOREIGN PATENT DOCUMENTS

| | | | |
|---|---|---|---|
| 789504 | 10/1935 | France | 123/671 |
| 57-165627 | 10/1982 | Japan | 123/661 |
| 1171599 | 8/1985 | U.S.S.R. | 123/661 |

OTHER PUBLICATIONS

S & S Products 1990 Engine Parts Catalog (Jan. 1990), p. 67.
Edward F. Obert, *Internal Combustion Engines and Air Pollution* (book), Harper & Row Publishers, Inc., Jan. 1973, pp. 103–110.

*Primary Examiner*—David A. Okonsky
*Attorney, Agent, or Firm*—Foley & Lardner

[57] ABSTRACT

An internal combustion engine has a cylinder head with a combustion chamber defined by a depression in the head. The raised face surface of a piston extends into the combustion chamber in the cylinder head as the piston approaches top dead center, and creates turbulent squish currents within the chamber as closely matching surfaces on the piston face and on the walls of the combustion chamber in the head force gases out from between these surfaces. The turbulence helps to prevent autoignition and allows higher compression ratios than would otherwise be possible.

43 Claims, 3 Drawing Sheets

INTERNAL COMBUSTION ENGINE HAVING HIGH PERFORMANCE COMBUSTION CHAMBER

FIELD OF THE INVENTION

The present invention relates generally to internal combustion engines, and more specifically to carbureted spark-ignition internal combustion engines with high compression ratios.

BACKGROUND OF THE INVENTION

In carbureted spark-ignition engines, one means of increasing the thermal efficiency (and thus the work output) of the engine is to increase the compression ratio, defined as the ratio of the maximum volume between the piston and the head to the minimum volume between the piston and the head. A higher compression ratio increases the thermal efficiency of the engine. It is therefore desirable for high-performance engines to have the greatest compression ratio possible.

However, the compression ratio cannot be increased indefinitely. The higher compression ratio causes higher temperatures and pressures in the combustion chamber's fuel-air mixture upon compression, thereby increasing the possibility of rapid self-ignition of the fuel-air mixture at some unplanned point during the work cycle. Such an event is commonly referred to as "knock" or autoignition.

A high degree of autoignition is undesirable because it lowers the engine efficiency and it also increases the chances of engine failure. Engine efficiency drops when autoignition occurs because cylinder gas expansion occurs at a time when its work potential cannot be fully utilized. For maximum work output, ignition is best begun shortly before the piston reaches top dead center so that peak combustion chamber pressures occur shortly after the piston reaches top dead center. Peak pressures at this point allow the work generated by the expanding combustion gases to be utilized over the greatest length of piston travel. The rapid pressure increases associated with autoignition can cause peak pressures to occur before this point, perhaps when the piston has not yet reached top dead center, thereby causing work losses by opposing the piston motion. Further, autoignition promotes heat losses from the engine because the combustion gases vibrate and "scrub" the cylinder walls as the shock wave from autoignition travels through the cylinder. Autoignition can also cause premature engine failure due to the extremely high temperatures it causes in the cylinder, as well as from the damage it causes by stress from the shock waves.

Autoignition is frequently triggered in high compression ratio engines by the normal process of ignition. The spark plug (or plugs) ignites the compressed fuel-air mixture, and as the flame front begins to travel from the spark site through the chamber, the end gas—the fuel-air mixture in the cylinder farthest away from the spark plug(s)—is additionally compressed by the expansion of the gases behind the flame front. The mixture is already at a state of high temperature and pressure due to its previous compression, and if this additional compression of the end gas causes further temperature and pressure increases, the end gas may autoignite.

While autoignition may be decreased by using a fuel with a higher octane rating—and therefore a higher ignition temperature—it is also helpful to increase the speed of combustion, leaving little time for autoignition of the end gas to occur. A number of steps may be taken to increase the rate of combustion, such as the use of modified fuels or multiple spark plugs. Another method involves increasing the turbulence in the combustion chamber immediately prior to and during combustion. Turbulence within the chamber causes the uniform flame front within the combustion chamber to distort, creating a more convective mode of heat transfer and sending "tongues" of highly reactive radicals from the flame front into the unburned mixture. These conditions combine to promote more rapid combustion of the unburned mixture than would occur in a quiescent, low-turbulence mixture.

While some turbulence is created within the combustion chamber by the mere act of the piston compressing the air-fuel mixture, the effect can be heightened by modifying the shape of the combustion chamber so that the motion of the piston interacts with the chamber contours to cause greater turbulence during compression. It is especially desirable if the greatest turbulence occurs in the end gas near the end of the compression stroke, just before ignition. Examples of chamber configurations designed to promote mixing and/or turbulence are found in U.S. Patents 4,838,222, 4,844,040, 5,115,774, and 5,115,776.

It is further desirable for the combustion period to be approximately constant, when measured in crankshaft degrees, over the range of speeds at which the engine will operate. This insures that regardless of engine speed, the expanding combustion gases will exert their peak pressures when the piston is at approximately the same position. A constant combustion period further insures that as the engine speed increases, thereby decreasing the compression time and causing more rapid temperature and pressure increases, the time for autoignition to occur will be proportionately decreased. A near-constant combustion period can be accomplished if the combustion chamber can be designed so that turbulence increases as engine speed is increased.

Autoignition is present in almost all internal combustion engines to some extent, and is difficult to totally eliminate. The goal of high-performance engine design is to minimize autoignition to such an extent that it no longer harms the engine's performance or its structure, while at the same time obtaining the highest compression ratio possible.

SUMMARY OF THE INVENTION

The internal combustion engine of the present invention operates with a high compression ratio while allowing the use of standard fuel. More specifically, the invention provides a carbureted spark-ignition engine particularly suited for motorcycles, with a high compression ratio, for example, on the order of $8\frac{3}{4}:1$ to $17:1$, which may operate on standard fuel without undue autoignition. The invention is able to attain this increased compression ratio by heightening the turbulence in the end gas. Further, autoignition is minimized at all operating states of the engine by increasing the turbulence in the end gas as the engine speed is increased so that the combustion period is approximately constant, when measured in crankshaft degrees, at all engine operating states. In this manner, the engine is able to achieve superior power output at all speeds without the damage and inefficiency associated with autoignition. Further, since the increased turbulence in the combustion chamber enhances combustion throughout the chamber, more complete combustion is obtained, leading to an increase in fuel economy and a reduction in the emission of unburnt hydrocarbons.

An engine assembly in accordance with the invention includes a cylinder head, a cylinder block, and a piston (or pistons) which reciprocates in a cylinder within the block. The cylinder head and block are attached to each other at a cylinder head mating surface and a cylinder, block mating surface. The cylinder head includes an inlet valve and inlet port, an exhaust valve and an exhaust port, a cylinder head combustion chamber, and the cylinder head mating surface. The shape of cylinder head portion of the combustion chamber is defined by a recess in the cylinder head mating surface extending towards the interior of the cylinder head. The recess includes a depression which is bounded at its periphery in part by a chamber shoulder, and this chamber shoulder is in turn bounded by a beveled rim surface extending from the periphery of the chamber shoulder to the cylinder head mating surface. The wall of the depression includes an inlet valve seat, an exhaust valve seat, and a spark plug seat in which a spark plug is mounted. When the inlet and exhaust valves are closed, their heads rest in their respective inlet and exhaust valve seats and form a barrier between the combustion chamber and the inlet and exhaust ports. The inlet valve seat and exhaust valve seat may extend beyond the periphery of the depression, thereby overlapping the chamber shoulder and/or the beveled rim surface and interrupting one or both of them. Thus, the chamber shoulder and beveled rim surface may exist in discrete segments which are interrupted by the valve seats, rather than continuously extending around the entire periphery of the depression.

In a preferred embodiment of the invention, the depression has a substantially semiovoidal surface, shaped similarly to an ellipsoid which is cut at a plane parallel to its major axis of rotation. The inlet and exhaust valve seats sit on opposite ends of the major axis at positions near the cylinder head mating surface and extend into the depression. The exhaust valve is preferably somewhat smaller than the intake valve. The ignition means, e.g., a single spark plug, is located on one side of the major axis between the valve seats. The chamber shoulder and the beveled rim surface preferably do not extend around the entire perimeter of the depression. They instead exist in two segments, each segment laying opposite to one another between the inlet and exhaust valve seats. While the segments extend so far as to end at the periphery of the intake valve seat at one side of the combustion chamber, they do not extend to the periphery of the smaller exhaust valve seat at the other side of the combustion chamber, and the surface of the depression surrounds much of the exhaust valve seat. Further, while the surface of the depression is substantially semiovoidal and thus has an oval periphery, the segments of the beveled rim surface do not conform to the arc of the oval periphery on either side of the major axis; the beveled rim surface exists as a straight planar segment extending from the region near the exhaust valve up to a point near the minor axis of the oval periphery, at which point it then curves towards the inlet valve.

The block of the engine includes a cylinder (or plural cylinders), a piston which reciprocates within the cylinder, and the cylinder block mating surface. The piston has a piston top face which includes a piston face reference surface and a raised piston face surface. When the piston is at top dead center, the piston face reference surface lies substantially in the plane of the block mating surface. The raised piston face extends above the plane of the piston face reference surface and comprises a beveled boundary surface, a raised planar face surface, and optionally a beveled valve clearance surface. The raised planar face surface is spaced above the piston face reference surface and is bounded by the beveled boundary surface, which extends from the raised face surface to the piston face reference surface. Therefore, when the piston is at top dead center, the raised planar face surface extends beyond the cylinder block mating surface and into the combustion chamber. At this point, a peripheral portion of the raised planar face surface closely approaches and is parallel to the chamber shoulder, and the beveled boundary surface closely approaches and is parallel to the beveled rim surface. This close approach of these surfaces produces strong currents in the combustion chamber as the piston approaches top dead center, by driving the fuel-air mixture from between these parallel surfaces into the combustion chamber. Additional squish currents are generated as the piston face reference surface closely approaches the portion of the cylinder head mating surface immediately adjacent to the combustion chamber.

If a portion of the chamber shoulder is wider than at other positions on the chamber shoulder, the piston will push a greater volume of gas from the space between this larger shoulder area and the raised piston surface than from other positions on the shoulder. The squish current generated at this point will therefore have greater velocity than at the other points, and greater turbulence will be induced in the area of the combustion chamber opposite this point. In the preferred embodiment of the invention, a larger shoulder is used opposite the spark plug to generate greater turbulence across the combustion chamber toward the spark plug immediately prior to and during ignition to assist in a more rapid and uniform ignition of the fuel-air mixture in the chamber.

The valve seats within the combustion chamber may extend beyond the periphery of the depression and onto the chamber shoulder and/or the beveled rim surface. To avoid having portions of the raised piston face strike the valve heads when the piston approaches top dead center, beveled valve clearance surfaces are provided on the raised piston face. These surfaces are recessed from the raised piston face so that the piston does not collide with the valve heads when the piston reaches top dead center. The beveled valve clearance surfaces are shaped such that they closely approach and are substantially parallel to the valve heads at top dead center, thereby producing additional squish currents by driving the fuel-air mixture from between these surfaces and the valve heads and into the main volume of the combustion chamber.

The engine of the invention is particularly suited for use in motorcycles. Depending on the performance requirements for the engine, the compression ratio of the engine may be reduced by forming a depression in the center of the piston face, thereby lowering the compression ratio and allowing the use of lower octane fuels, and allowing greater flexibility for use of head and piston kit with different displacement engines. The entire engine may be installed within a motorcycle as a unit, or the cylinder head or piston may be installed within a motorcycle engine of similar and compatible type. The cylinder head and piston may be provided as a kit so that it will be possible to install both the cylinder head and piston in existing motorcycle engines.

Further objects, features, and advantages of the invention will be apparent from the following detailed description when taken in conjunction with the accompanying drawings.

DETAILED DESCRIPTION OF THE INVENTION

Figure 1:
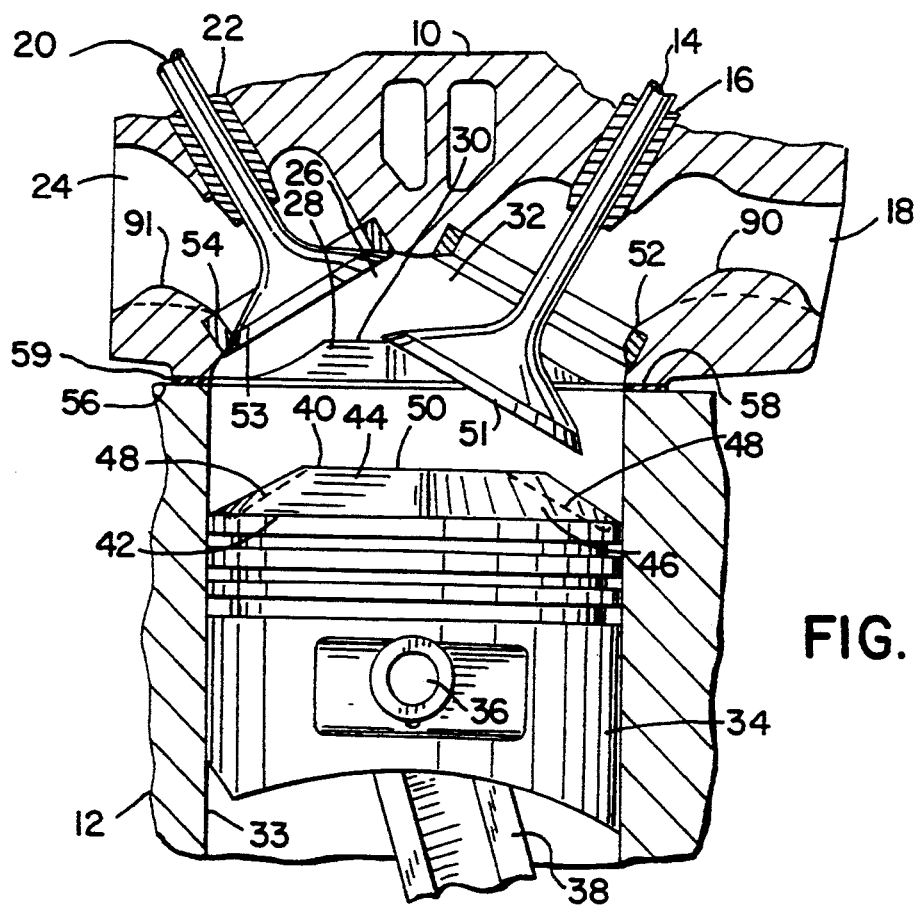
FIG. 1 is a cross-sectional view of a portion of an engine in accordance with the present invention, showing the cylinder head assembly, the cylinder block, and the piston.
Figure 2:
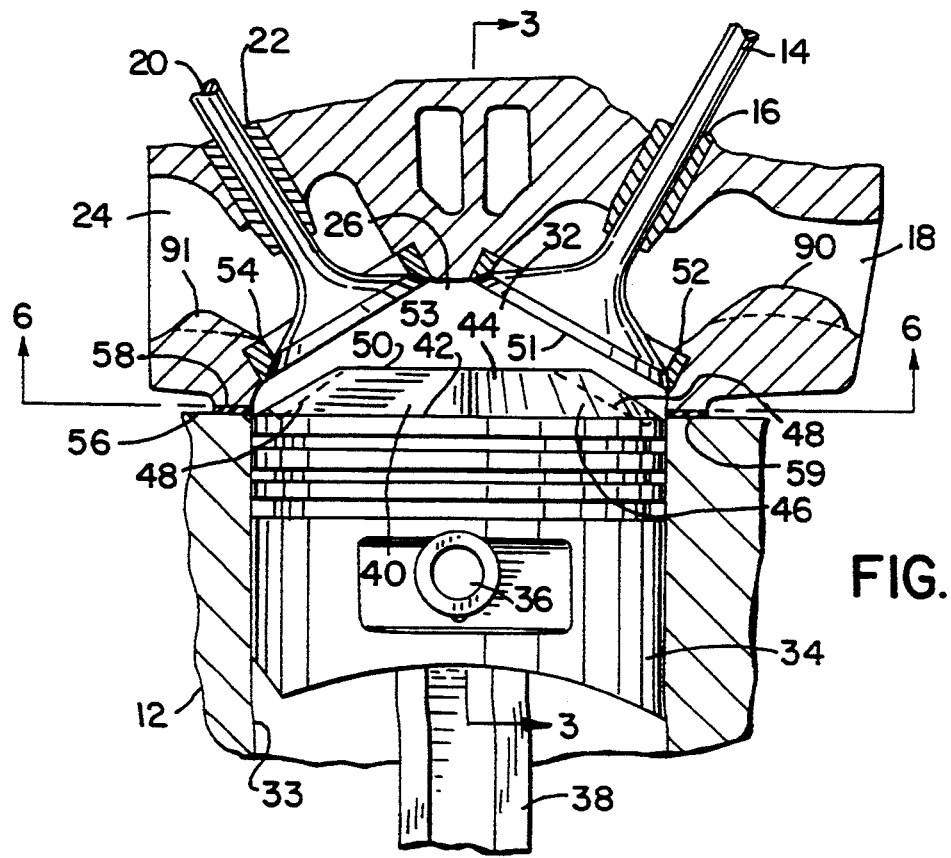
FIG. 2 is a cross-sectional view of the engine of FIG. 1 when the piston is at top dead center.
Figure 3:
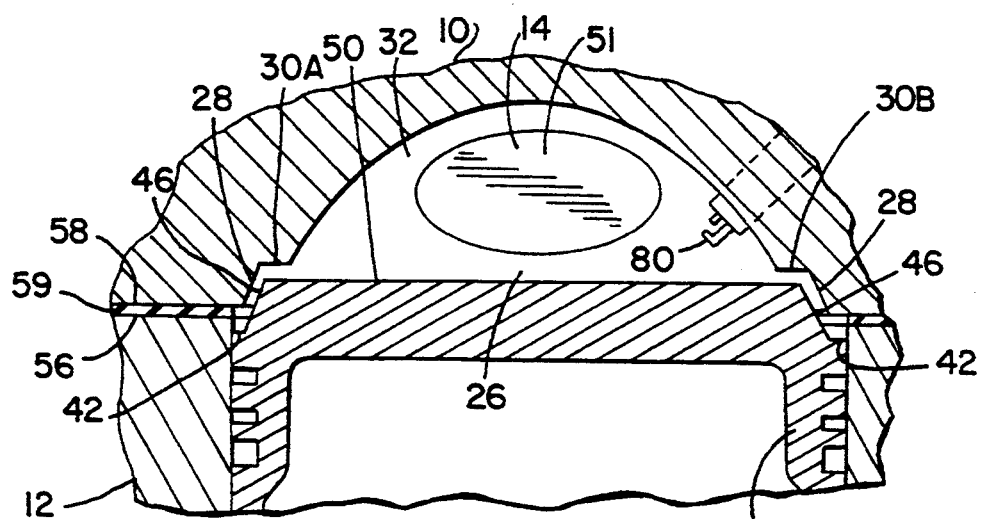
FIG. 3 is a cross-sectional view of the engine of FIG. 2, when the piston is at top dead center, viewed at a point 90 degrees around the axis of the cylinder from FIG. 2 and generally along the lines 3—3 of FIG. 2.
Figure 6:
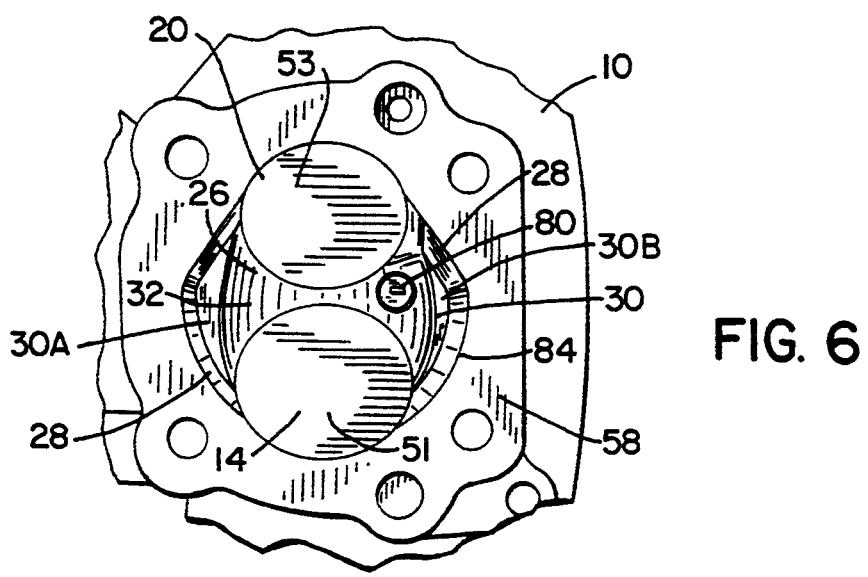
FIG. 6 is a plan view of the cylinder head, showing the inner walls of the combustion chamber within the cylinder head.

With reference to the drawings, a cross-sectional view of a carbureted spark-ignition internal combustion engine assembly in accordance with the invention is shown in FIG. 1. The engine assembly includes a cylinder head 10 which is mounted atop a cylinder block 12. The head includes an intake valve 14, an intake valve guide 16, an intake port 18, an exhaust valve 20, an exhaust valve guide 22, and an exhaust port 24. Within the cylinder head 10, a combustion chamber 26 is formed which includes a beveled rim surface 28, a planar chamber shoulder 30, composed of separated portions 30A and 30B, as shown in FIG. 3, and walls defining a depression 32. Other views of the cylinder head 10 are shown in FIGS. 3 and 6, with a cross-sectional view in FIG. 3 and a plan view in FIG. 6; these will shortly be discussed in greater length. The cylinder block 12 has a cylinder defined by a cylindrical wall 33, within which a piston 34 reciprocates. The piston 34 pivots about an wrist pin 36 which attaches the piston to a connecting rod 38. A piston top face 40 includes a piston face reference surface 42, and a raised piston face 44 which includes a beveled boundary surface 46, beveled valve clearance surfaces 48, and a raised planar face surface 50. The view shown in FIG. 1 is of the engine as it undergoes its intake stroke, indicated by the head 51 of the intake valve 14 clearing an intake valve seat 52. At this point, the head 53 of the exhaust valve 20 is nested within an exhaust valve seat 54. As illustrated in FIGS. 1 and 2, a planar cylinder head mating surface 58 is mounted in adjoining relation to a cylinder block mating surface 56 with a head gasket 59 between the two surfaces. For clarity of illustration, other standard parts of the engine (e.g., the crankshaft, valve lifters, camshaft, push rods, etc.) are not shown in FIGS. 1 and 2, and any suitable parts may be used. The engine (e.g., an air cooled motorcycle engine) may also have two or more cylinders constructed as described.

FIG. 2 shows a cross-sectional view of the engine assembly as in FIG. 1 but at the point when the piston 34 is at top dead center. FIG. 3 shows a cross-section of the engine of FIGS. 1 and 2 along a section line rotated 90 degrees around the cylinder axis from FIGS. 1 and 2. At top dead center, the raised piston face 44 extends beyond the mating surface 56 of the cylinder block 12 and into the combustion chamber of the cylinder head 10. The beveled boundary surface 46 of the piston closely approaches and is parallel to the beveled rim surface 28 in the cylinder head 10. Similarly, edge portions of the raised planar face surface 50 closely approach the chamber shoulders 30A and 30B in the cylinder head, and edge portions of the piston face reference surface 42 closely approach the cylinder head mating surface 58. A squish current is generated when the fuel-air mixture between the approaching surfaces 46 and 28, 50 and 30A and 30B, and 42 and 58, is rapidly compressed as the piston 34 approaches top dead center, and the fuel-air mixture between these surfaces is driven at high velocity into the combustion chamber 26. The beveled valve clearance surfaces 48 (as shown as hidden lines in FIGS. 1 and 2) allow the piston 34 to clear the heads 51 and 53 of valves 14 and 20, respectively, when the piston is at top dead center, allowing the piston to reach a position closely adjacent to the valve heads and thereby producing additional squish currents.

Figure 4:
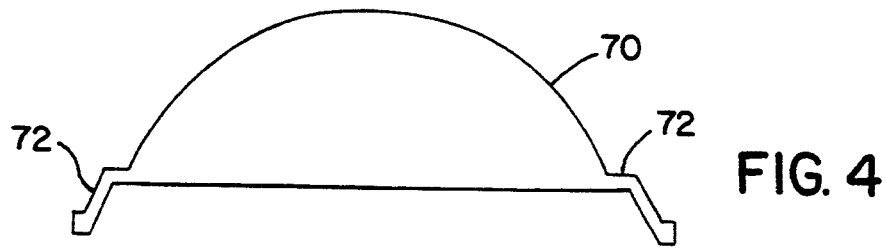
FIG. 4 is a schematic view of the approximate volume defined by the combustion chamber of FIG. 3.
Figure 5:
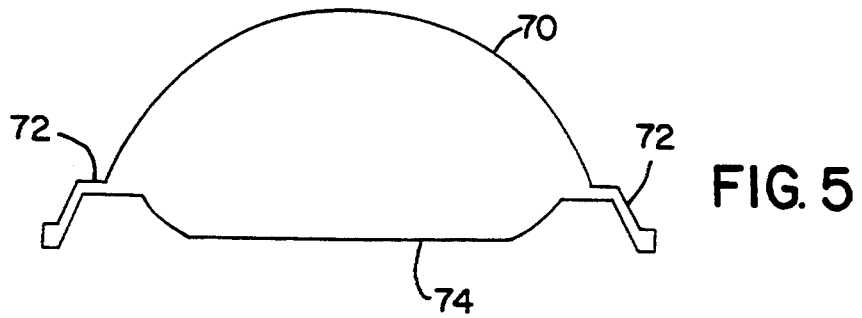
FIG. 5 is a schematic view of the approximate volume of the combustion chamber showing the additional chamber volume of the depression when a modified piston, with a depression in the piston top face, is used.

FIG. 4 is an idealized schematic side view of the approximate volume defined by the combustion chamber at top dead center. In the preferred embodiment, the cylinder head combustion chamber has a volume 70 which is much greater than the main "squish volume" 72 (the volume defined between the raised piston face surface 50 and the chamber shoulders 30A and 30B) and between the beveled boundary surface 46 and the beveled rim surface 28. For example, if the combustion chamber 70 has a volume of 112.5 cubic centimeters (cc), then the squish volume 72 may have a volume of, for example, 12.9 cc. FIG. 5 illustrates the volume defined by the combustion chamber at top dead center with a modified piston having a depression in the piston top face 40 which adds a volume 74 (of, for example, 43.1 cc), to the combustion chamber 26 to reduce the overall compression ratio.

FIG. 6 is a view of the cylinder head 10 showing the combustion chamber 26 and the cylinder head mating surface 58. As shown therein and in FIG. 1, the intake valve 14 and intake valve seat 52, exhaust valve 20 and exhaust valve seat 54, and a spark plug 80 are all mounted on the depression wall 32 which defines part of the combustion chamber in the head. The depression wall 32 is bounded on two sides by the chamber shoulders 30A and 30B, which are in turn bounded by the beveled rim surfaces 28. The chamber shoulder 30A, at a position opposite the spark plug 80, is preferably wider than the chamber shoulder 30B on the same side of the combustion chamber 26 as the spark plug 80. The wider chamber shoulder 30A causes a greater volume of fuel-air mixture to be driven away from the approaching surfaces at the area of the shoulder 30A as the piston 34 approaches top dead center than from the area of the chamber shoulder 30B, thereby creating a higher-velocity squish current and more turbulence which extends across the combustion chamber to the vicinity of the spark plug 80. Since ignition occurs shortly before the piston 34 reaches top dead center, the especially turbulent conditions near the spark plug 80 during ignition help the flame front, which is advancing outward from the spark plug 80, to distort and spread rapidly through the combustion chamber 26.

The depression 32 defining the combustion chamber has a substantially semiovoidal shape (a portion of an ellipsoid), with the heads of the intake valve 14 and the exhaust valve 20 laying near the ends of the ellipsoid on its major axis. The periphery of the combustion chamber 26, labeled as the line 84 along the cylinder head mating surface 58, is not quite ovate; the periphery surrounding the intake valve seat 52 more closely approaches this valve seat than it does the exhaust valve seat 54. This exposes a greater area on the cylinder head mating surface 58 to the piston face reference surface 42, and thereby also helps to create more vigorous squish currents in the combustion chamber 26. As best shown in the views of the piston 34 in FIGS. 7-10, the top face 40 of the piston is appropriately formed to match the periphery 84 of the cylinder head portion of the combustion chamber. The piston face reference surface 42 has at least one and preferably two widened portions 42A. The beveled boundary surface 46 has at least one and preferably two substantially straight portions 46A which extend from the widened portions 42A of the piston face reference surface to the raised piston face surface 50. The two widened portions 42A of the piston reference surface are preferably arranged to lie adjacent opposite sides of one of the valve seats, e.g., adjacent to the beveled valve clearance surfaces 48 for the exhaust valve, when the piston is at top dead center. The beveled boundary surface 46, including the substantially straight portions 46A, are bounded by the piston face reference surface 42, which includes the widened portions 42A thereof. The beveled boundary surface 46, including the straight portions 46A as best shown in FIG. 7, and the beveled rim surface 28, including substantially straight portions 28A thereof as shown in FIG. 6, are formed to match, so that at top dead center the beveled boundary surface 46 of the piston closely approaches and is parallel to the beveled rim surface 28.

Figure 7:
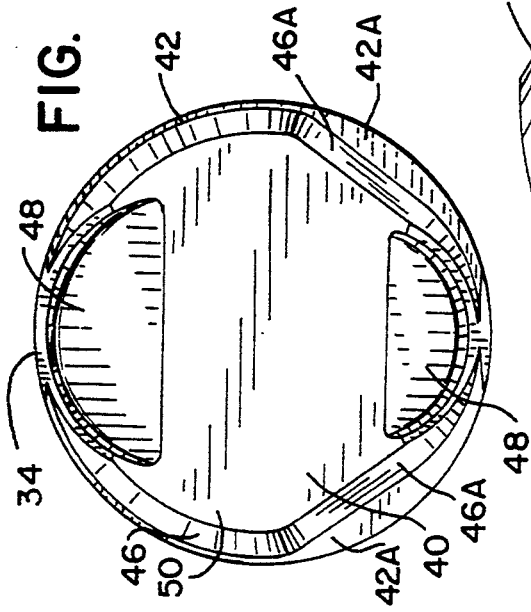
FIG. 7 is a plan view of the piston showing its top face.
Figure 8:
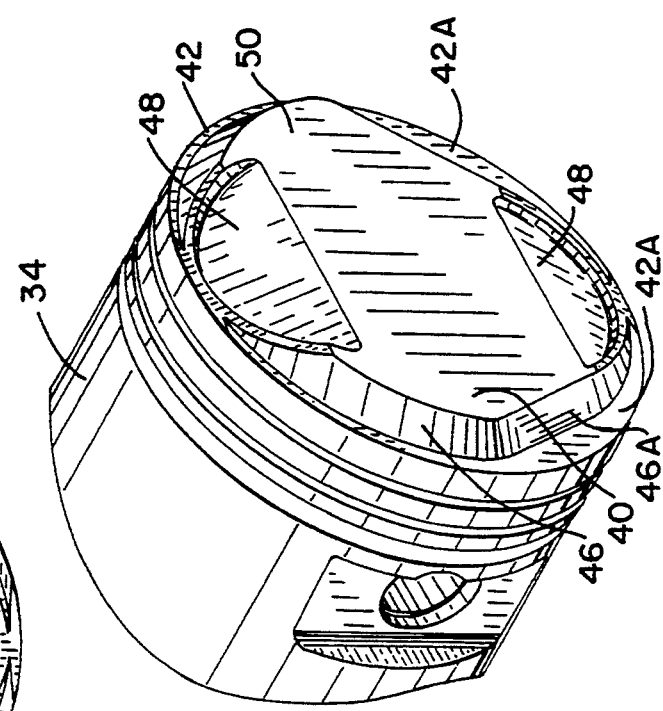
FIG. 8 is a perspective view of the piston of FIG. 7.

FIGS. 7 and 8 illustrate the piston 34 and particularly the piston top face 40. The raised face surface 50 is bounded by the beveled boundary surface 46 and also by the beveled valve clearance surfaces 48. At top dead center, the raised face surface 50 closely approaches the chamber shoulders 30A and 30B in the cylinder head 10 to produce the squish volume 72 depicted in FIG. 4. Further, at top dead center, the beveled boundary surface 46 closely approaches the beveled rim surface 28, the beveled valve clearance surfaces 48 closely approach the head 51 of the intake valve 14 and the head 53 of the exhaust valve 20, and the piston face reference surface 42 closely approaches the cylinder head mating surface 58, all creating squish currents.

Within standard IC engines, the area near the wall of the combustion chamber generally contains a higher concentration of unburnt hydrocarbons during and after combustion due to the more quiescent boundary layer conditions adjacent to the chamber wall. Because the squish currents within the invention greatly enhance the turbulence within the combustion chamber, the boundary layer is invaded by plumes of hot gases and reactive radicals during combustion, and greater amounts of unburnt hydrocarbons are consumed by the combustion process. This decreases the amount of unburnt hydrocarbons in the engine exhaust, and it also increases the fuel economy of the engine because lesser amounts of unburnt hydrocarbon chains escape the combustion chamber without contributing to the work output of the combustion process.

The cylinder head 10 and mating piston 34 may be provided together as a kit and installed on existing engines to provide enhanced performance of the engine.

Figure 9:
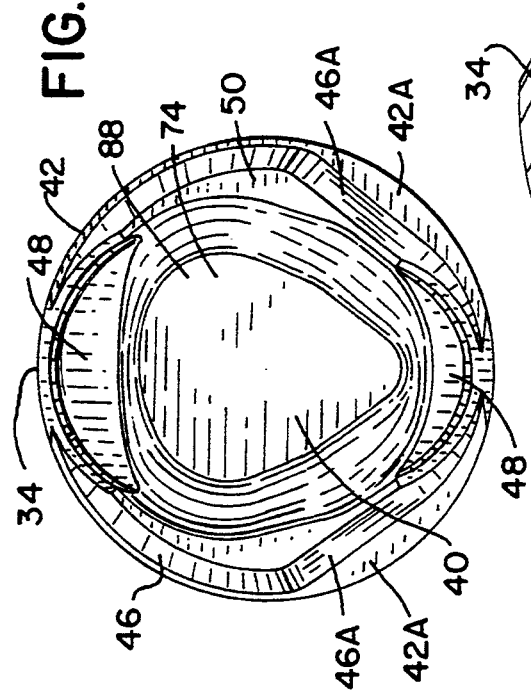
FIG. 9 is a plan view of a piston modified by the formation of a depression on the piston top face.
Figure 10:
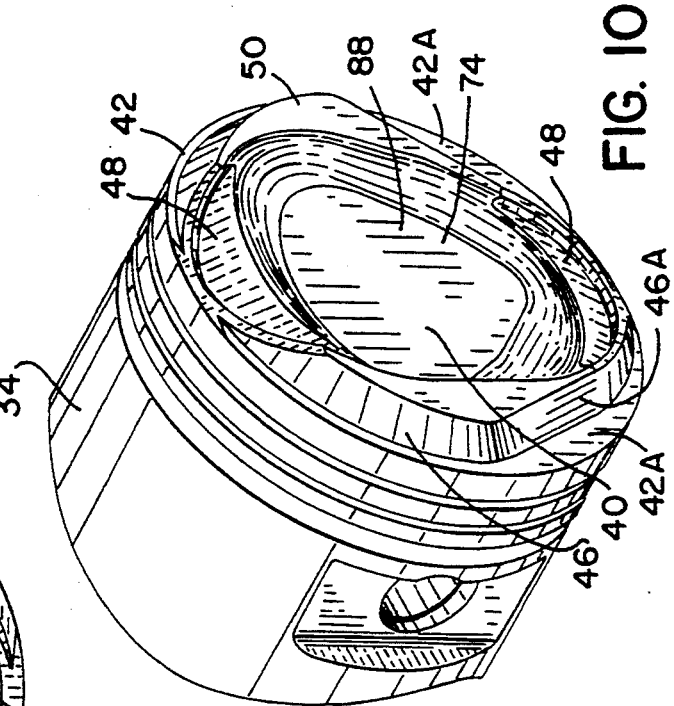
FIG. 10 is a perspective view of the modified piston of FIG. 9.

FIGS. 9 and 10 illustrates a piston 34 which is modified by the addition of a depression 74 in the piston face. The depression 74 increases the combustion chamber volume (e.g., by 43.1 cc for the exemplary engine dimensions given above) and decreases the compression ratio to a level more appropriate for lower octane gasoline. An idealized schematic representation of the combustion chamber with the piston depression 74 is shown in FIG. 5. It is understood that the depression 74 in the piston will generally have a flat bottom 88, as illustrated in FIGS. 9 and 10, to ensure that the top wall of the piston under the depression is of adequate thickness.

Raised vanes 90 and 91 as shown in FIG. 2 may be formed in the walls of the intake port 18 and exhaust port 24 adjacent the valve seats as shown in FIGS. 1 and 2 to enhance the flow of gases into and out of the cylinder. These vanes, which are preferably cast integrally with the head, help to strengthen the floor of the intake and exhaust ports, in addition to diverting gas flow around the intake and exhaust valves. The enhanced flow of gases into and out of the combustion chamber further increases the efficiency of the engine.

It is understood that the invention is not confined to the particular construction and arrangement of parts herein illustrated and described, but embraces such modified forms thereof as come within the scope of the following claims.

What is claimed is:

1. An internal combustion engine assembly comprising:
    (a) a cylinder head having a cylinder head mating surface, a combustion chamber in the cylinder head recessed from the cylinder head mating surface, the combustion chamber including a wall defining a depression, a chamber shoulder, a beveled rim surface, an inlet valve seat and an exhaust valve seat in the wall of the depression, the depression bounded around at least a part of its periphery by the chamber shoulder and the chamber shoulder being in turn bounded by the beveled rim surface which extends from the periphery of the chamber shoulder to the cylinder head mating surface; and
    (b) a cylinder block including a cylinder block mating surface, a wall therein defining a cylinder, and a piston within the cylinder, with the cylinder block mating surface adjoining the cylinder head mating surface, the piston having a piston top face including a piston face reference surface and a raised piston face surface, with the piston face reference surface located on the piston such that at top dead center it lies substantially in the plane of the cylinder block mating surface and closely approaches and is parallel to the cylinder head mating surface, the raised piston face surface spaced from the piston face reference surface such that the raised piston face surface is above the cylinder head mating surface when the piston is at top dead center, the piston top face further including a beveled boundary surface extending from the piston face reference surface to the raised face surface with the raised face surface bounded by the beveled boundary surface, the piston face reference surface having at least one widened portion from which the beveled boundary surface extends to the raised face surface, and wherein the beveled boundary surface and the beveled rim surface are formed to match so that, at top dead center, the beveled boundary surface of the piston closely approaches and is parallel to the beveled rim surface of the cylinder head, a portion of the raised piston face surface closely approaches and is parallel to the chamber shoulder, and the piston face reference surface including the widened portion thereof closely approaches and is parallel to the cylinder head mating surface.

2. The internal combustion engine assembly of claim 1 wherein the raised piston face surface is a planar surface over the area bounded by the beveled boundary surface.

3. The internal combustion engine assembly of claim 1 wherein the piston top face includes a wall defining a depression extending downwardly from a planar portion of the raised piston face surface towards the interior of the piston.

4. The internal combustion engine assembly of claim 1 wherein at least one of the valve seats overlaps the chamber shoulder.

5. The internal combustion engine assembly of claim 1 wherein at least one of the valve seats overlaps the chamber shoulder and the beveled rim surface, and the piston top face includes beveled valve clearance surfaces extending downwardly from a planar raised piston face surface such that the beveled valve clearance surfaces rest closely adjacent to valve heads seated in the valve seats when the piston reaches top dead center.

6. The internal combustion engine assembly of claim 1 including a spark plug mounted in the depression wall of the combustion chamber.

7. The internal combustion engine assembly of claim 1 wherein the chamber shoulder has two parts, with a shoulder part on one side of the depression wider than the shoulder part on the opposite side of the depression.

8. The internal combustion engine assembly of claim 7 wherein the wider chamber shoulder is located on a side of the combustion chamber opposite to a spark plug mounted in the depression wall of the combustion chamber.

9. The internal combustion engine assembly of claim 1 wherein the chamber shoulder and beveled rim surface are formed in at least two parts arranged about the periphery of the depression.

10. The internal combustion engine assembly of claim 9 wherein the valve seats are located on the depression wall between the parts of the chamber shoulder and beveled rim surface.

11. The internal combustion engine assembly of claim 1 wherein the beveled rim surface is formed in at least two connected parts, at least one of which is planar.

12. The internal combustion engine assembly of claim 11 wherein the planar part of the beveled rim surface is adjacent to the exhaust valve seat.

13. The internal combustion engine assembly of claim 1 wherein the depression wall defines a substantially semiovoidal surface which has a major axis.

14. The internal combustion engine assembly of claim 13 wherein the inlet and exhaust valve seats are located near the opposite sides of the depression along the major axis.

15. The internal combustion engine assembly of claim 14 wherein a spark plug is mounted in the wall of the depression between the inlet and exhaust valve seats.

16. The internal combustion engine assembly of claim 1 wherein the intake valve seat is larger than the exhaust valve seat.

17. The internal combustion engine assembly of claim 1 including an intake port in the cylinder head extending from the intake valve seat, and a vane integrally formed in a wall of the intake port adjacent to the valve seat.

18. The internal combustion engine assembly of claim 1 including an exhaust port in the cylinder head extending from the exhaust valve seat, and a vane integrally formed in a wall of the exhaust port adjacent to the valve seat.

19. A cylinder head and piston kit comprising:
a cylinder head having a cylinder head mating surface, a combustion chamber in the cylinder head recessed from the cylinder head mating surface, the combustion chamber including a wall defining a depression, a chamber shoulder, a beveled rim surface, an inlet valve seat and an exhaust valve seat in the wall of the depression, the depression bounded around at least a part of its periphery by the chamber shoulder and the chamber shoulder being in turn bounded by the beveled rim surface which extends from the periphery of the chamber shoulder to the cylinder head mating surface; and
a piston having a piston top face including a piston face reference surface and a raised piston face surface, with the piston face reference surface located on the piston such that when the piston is installed within an engine, at top dead center the piston face reference surface closely approaches and is parallel to the cylinder head mating surface, and with the raised piston face surface spaced from the piston face reference surface such that the raised piston face surface is above the cylinder head mating surface when the piston is at top dead center, the piston top face further including a beveled boundary surface extending from the piston face reference surface to the raised face surface with the raised face surface bounded by the beveled boundary surface the piston face reference surface having at least one widened portion from which the beveled boundary surface extends to the raised face surface, and wherein the beveled boundary surface and the beveled rim surface are formed to match so that, at top dead center, the beveled boundary surface of the piston closely approaches and is parallel to the beveled rim surface of the cylinder head, a portion of the raised piston face surface closely approaches and is parallel to the chamber shoulder, and the piston face reference surface including the widened portion thereof closely approaches and is parallel to the cylinder head mating surface.

20. The cylinder head and piston kit of claim 19 wherein the raised piston face surface is a planar surface over the area bounded by the beveled boundary surface.

21. The cylinder head and piston kit of claim 19 wherein the piston top face includes a wall defining a depression extending downwardly from a planar portion of the raised piston face surface towards the interior of the piston.

22. The cylinder head and piston kit of claim 19 wherein at least one of the valve seats overlaps the chamber shoulder.

23. The cylinder head and piston kit of claim 19 wherein at least one of the valve seats overlaps the chamber shoulder and the beveled rim surface, and the piston top face includes beveled valve clearance surfaces extending downwardly from a planar raised piston face surface such that the beveled valve clearance surfaces rest closely adjacent to valve heads seated in the valve seats when the piston reaches top dead center.

24. The cylinder head and piston kit of claim 19 including a spark plug mounted in the depression wall of the combustion chamber.

25. The cylinder head and piston kit of claim 19 wherein the chamber shoulder has two parts, with a shoulder part on one side of the depression wider than the shoulder part on the opposite side of the depression.

26. The cylinder head and piston kit of claim 25 wherein the wider chamber shoulder is located on a side of the combustion chamber opposite to a spark plug mounted in the depression wall of the combustion chamber.

27. The cylinder head and piston kit of claim 19 wherein the chamber shoulder and beveled rim surface are formed in at least two parts arranged about the periphery of the depression.

28. The cylinder head and piston kit of claim 27 wherein the valve seats are located on the depression wall between the parts of the chamber shoulder and beveled rim surface.

29. The cylinder head and piston kit of claim 19 wherein the beveled rim surface is formed in at least two connected parts, at least one of which is planar.

30. The cylinder head and piston kit of claim 19 wherein the planar part of the beveled rim surface is adjacent to the exhaust valve seat.

31. The cylinder head and piston kit of claim 19 wherein the depression wall defines a substantially semi-ovoidal surface which has a major axis.

32. The cylinder head and piston kit of claim 31 wherein the inlet and exhaust valve seats are located near the opposite sides of the depression along the major axis.

33. The cylinder head and piston kit of claim 32 wherein a spark plug is mounted in the wall of the depression between the inlet and exhaust valve seats.

34. The cylinder head and piston kit of claim 19 wherein the intake valve seat is larger than the exhaust valve seat.

35. The cylinder head and piston kit of claim 19 in combination with an intake valve and an exhaust valve.

36. The cylinder head and piston kit of claim 19 including an intake port in the cylinder head extending from the intake valve seat, and a vane integrally formed in a wall of the intake port adjacent to the valve seat.

37. The cylinder head and piston kit of claim 19 including an exhaust port in the cylinder head extending from the exhaust valve seat, and a vane integrally formed in a wall of the exhaust port adjacent to the valve seat.

38. The internal combustion engine of claim 1 wherein the piston face reference surface has two widened portions which are arranged to lie adjacent opposite sides of one of the valve seats when the piston is at top dead center.

39. The internal combustion engine of claim 1 wherein the beveled boundary surface of the piston has a substantially straight portion thereof extending from at least one widened portion of the piston face reference surface to the raised piston face surface.

40. The internal combustion engine of claim 1 wherein the piston face reference surface has two widened portions and the beveled boundary surface has two substantially straight portions thereof extending from the two widened portions to the raised piston face surface.

41. The cylinder head and piston kit of claim 19 wherein the piston face reference surface has two widened portions which are arranged to lie adjacent opposite sides of one of the valve seats when the piston is installed in an engine and is at top dead center.

42. The cylinder head and piston kit of claim 19 wherein the beveled boundary surface of the piston has a substantially straight portion thereof extending from at least one widened portion of the piston face reference surface to the raised piston face surface.

43. The cylinder head and piston kit of claim 19 wherein the piston face reference surface has two widened portions and the beveled boundary surface has two substantially straight portions thereof extending from the two widened portions to the raised piston face surface.

* * * * *